United States Patent [19]

Naig

[11] Patent Number: 4,893,736

[45] Date of Patent: Jan. 16, 1990

[54] GRAIN WAGON BOX WITH SAFETY GRID

[76] Inventor: Charley B. Naig, P.O. Box 283, Graettinger, Iowa 51324

[21] Appl. No.: 194,331

[22] Filed: May 16, 1988

[51] Int. Cl.[4] ............................................. E04C 2/42
[52] U.S. Cl. ................................... 222/185; 222/192;
52/197; 52/664; 105/247
[58] Field of Search ............... 222/192, 185; 105/377,
105/247; 209/394, 395; 414/288; 52/3, 192,
197, 660, 664

[56] References Cited

U.S. PATENT DOCUMENTS

| 472,661 | 4/1892 | Roberts . | |
|---|---|---|---|
| 935,516 | 9/1909 | Jewett | 209/394 |
| 1,036,849 | 8/1912 | Huttel | 105/377 |
| 1,289,778 | 12/1918 | Houck | 209/394 |
| 1,383,151 | 6/1921 | Quehl . | |
| 2,797,000 | 6/1957 | Winter | 214/47 |
| 2,906,438 | 9/1959 | Carpenter | 222/177 |
| 3,108,720 | 10/1963 | Roach et al. | 222/318 |
| 3,241,673 | 3/1966 | Beresinsky | 209/395 |
| 3,974,599 | 8/1976 | Grosh | 52/20 |
| 4,136,010 | 1/1979 | Pilie et al. | 210/164 |
| 4,282,695 | 8/1981 | Lew | 52/664 X |
| 4,646,942 | 3/1987 | Kuhns | 222/506 X |
| 4,761,930 | 8/1988 | Tepera | 52/664 X |

Primary Examiner—Joseph J. Rolla
Assistant Examiner—Gregory L. Huson
Attorney, Agent, or Firm—Zarley, McKee, Thomte, Voorhees & Sease

[57] ABSTRACT

A safety grid for center discharge grain boxes includes cross members and longitudinally extending rod members. The grid may be fitted to grain boxes having varying sizes through the use of an adjustable bolt movably connected to the cross members and connected to the box side walls. The cross members may be either tubular or L-shaped in cross section and are interconnected by longitudinally extending rod members.

16 Claims, 2 Drawing Sheets

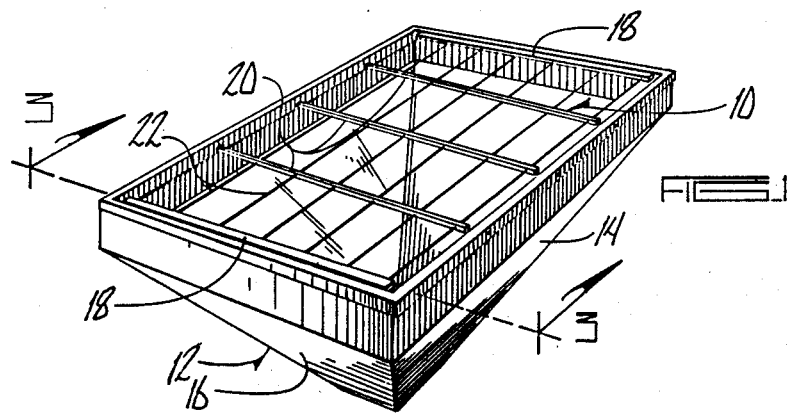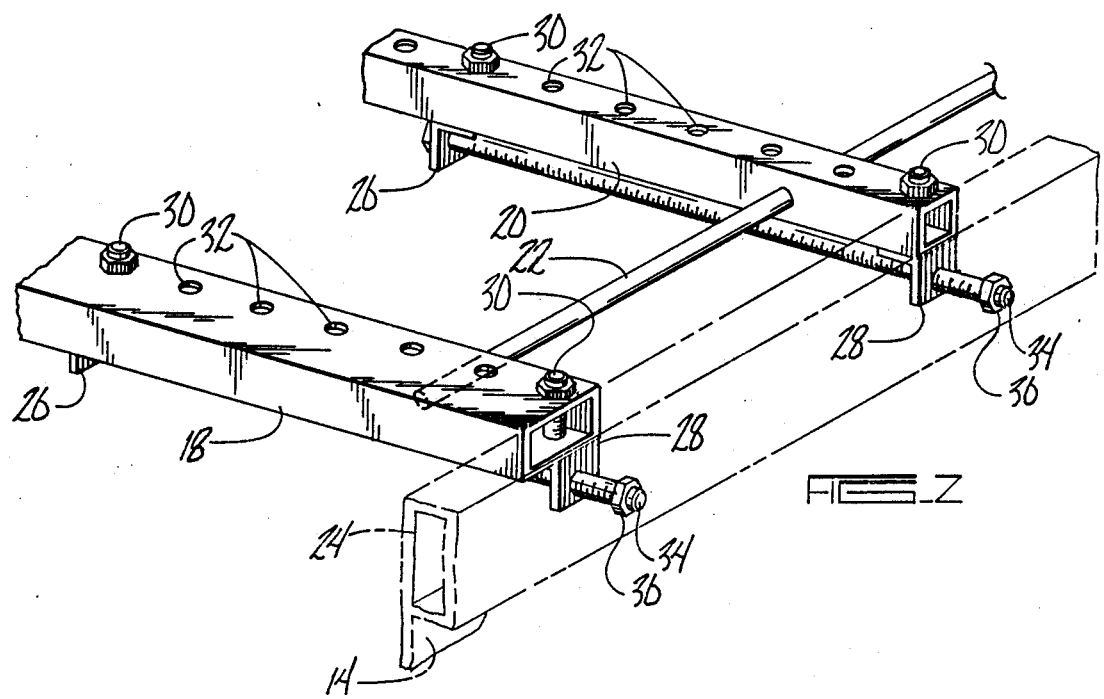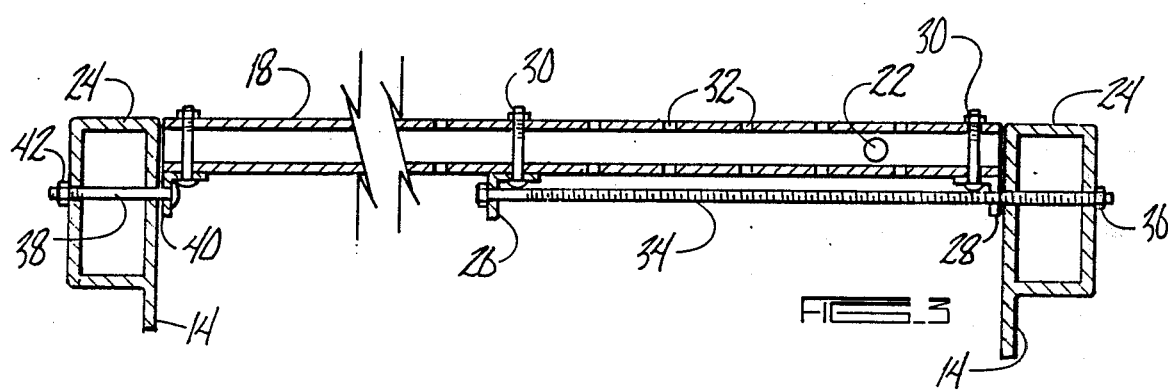

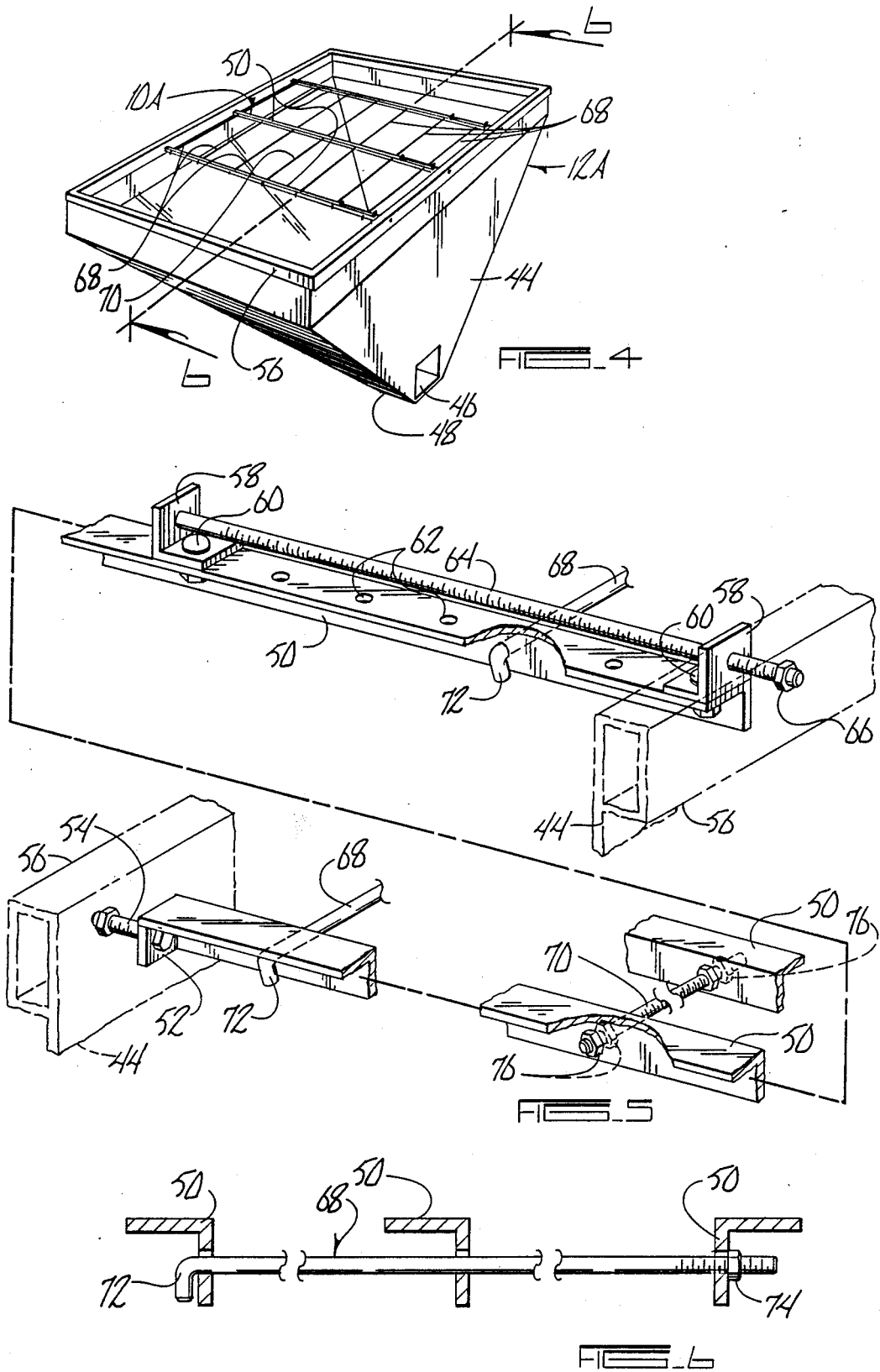

GRAIN WAGON BOX WITH SAFETY GRID

BACKGROUND OF THE INVENTION

A grain wagon being emptied can be very dangerous to children should they get inside the wagon box. The box will usually have a side or bottom center discharge and the suction generated by the grain moving downwardly will draw the child into and under the grain causing physical injury and suffocation. A safety grid for gravity discharge grain wagons is needed to protect children from injury and death.

SUMMARY OF THE INVENTION

A removable grid is provided for both center and bottom discharge gravity-fed grain wagon boxes. The grid may extend over only the center area above the discharge opening preventing direct human access to the discharge opening or over the entire box.

The safety grid is comprised of cross members and members extending longitudinally of the box. The grid is adaptable to boxes having different sizes by bolts on one end of the cross members being adjustably connected to the cross members such that only the outer ends of the bolts extend outwardly of the adjacent box side wall. The remainder of the bolts extend along the cross members and are connected thereto by movable brackets. The opposite ends of the cross members are connected directly to the adjacent side wall.

The longitudinally extending members are rods which may be connected to the cross members by extending through them and having a 90 degree bend end portions or nuts. Cross members may be either tubular in cross-section or angular with 90 degree legs. Longitudinal members will terminate inside the tubular cross members at opposite ends of the wagon.

DESCRIPTION OF THE DRAWINGS

FIG. 1 is a fragmentary perspective view of the safety grid on a center discharge gravity-fed grain wagon.

FIG. 2 is a fragmentary perspective view of the safety grid.

FIG. 3 is a cross-sectional view taken along Line 3—3 in FIG. 1.

FIG. 4 is a perspective view of an alternate embodiment of the safety grid in a gravity-fed center side discharge wagon box.

FIG. 5 is a fragmentary perspective view of a portion of the safety grid of FIG. 4.

FIG. 6 is a cross-sectional view taken along Line 6—6 in FIG. 4.

DESCRIPTION OF THE PREFERRED INVENTION

The safety grid of this invention is referred to in FIG. 1 generally by the reference numeral 10 and is shown mounted in a center dump wagon box 12. The wagon box has opposite side walls 14 which slope inwardly towards the center discharge opening, as do opposite end walls 16. The grid 10 includes a plurality of cross-members 18 and 20 interconnected by longitudinally extending rod members 22. The cross members 18 and 20 are connected to side rails 24 along the top edges of side walls 14 of the box 12.

The tubular cross-members may have different cross-sectional areas and be of different cross-sectional shapes. The cross member 18 is larger than the cross member 20, and the cross member 18 is located at opposite ends of the box substantially abutting against end wall 16.

Each of the cross members includes a pair of downwardly extending L-shaped brackets 26 and 28 movably positioned along the length of the cross members by bolts 30 received in a series of holes 32. The safety grid 10 will adapt to boxes having varying sizes by elongated bolts 34 extending through the tabs 26 and 28 outwardly through the side wall 14 and rail 24, where they are held in place by nuts 36. Only the outer ends of the bolts 34 are exposed regardless of the size of the box since the remainder of the bolt 34 extends along the cross member, as seen, for example, in FIG. 3. The righthand end of the cross member may abut against the righthand side of the box wall 14 or be spaced up to 12 inches away, depending on the size of the grid and the size of the box. The bolts 34 will accommodate these different relationships.

The cross members 18 and 20 are connected to the lefthand side of the box by second bolts 38 extending through the downwardly extending L-shaped bracket 40 on the end of the cross members and through the side wall 14 and rail 24. A nut 42 is provided on the outside of the rail 24. The left end of the cross members will normally abut against the inside face of the side wall 14, as seen in FIG. 3, as the adjustable end of the cross member is on the right side.

The longitudinal rods 22 extend through the intermediate cross members 20 and terminate inside the end cross members 18.

In FIGS. 4-6, an alternate safety grid, 10A, is shown on a gravity-fed side center discharge grain box 12A. The grain box 12A has a vertical side wall 44 and an opposite side wall which slopes toward the discharge opening 46, as do opposite end side walls 48.

The safety grid 10A is positioned over the substantial center area of the grain box above the discharge 46, leaving open the opposite ends 48. The grid 10A comprises 3 cross members 50, L-shaped in cross section. The left end of the cross members 50 includes end bracket tabs 52 welded to the legs of the cross member which receives mounting bolts 54 extending through the wagon side wall 44 and the rail 56. The opposite or righthand side of the cross members 50 includes a pair of upwardly extending L-shaped brackets 58 which may be selectively positioned along the cross members by bolts 60 being received in openings 62. The cross member 50 is secured to the side wall 44 on the right side by the elongated bolt 64 extending through the brackets 58 and through the side wall 44 and rail 56. Again, only the outer end 66 of the bolt 64 is exposed on the outside of the box since the remainder of the bolt extends along the cross member 50 inside the box.

The grid 10A further includes longitudinally extending rod members 68 and a threaded rod member 70. The rod members 68 have a right angle bend 72 on one outer end, and a nut, 74, on the opposite end, as seen in FIG. 6. The center longitudinal rod member 70 is threaded at both ends and is secured in place by nuts 76 on opposite sides of the downwardly extending leg of the cross member 50, thus positioning the outer cross members for the desired spacing of the cross members.

Thus, it is seen in operation that any grain box may be fitted to a safety grid either extending over the entire top area or the substantial center area. The safety grid may be quickly assembled and mounted in place on the box or removed as desired. The grid will prevent accidental entry into the grain by children and others preventing injury and suffocation due to the downdraft of the following grain.

It is understood that the grid could be constructed of chain or cord.

What is claimed is:

1. A grain wagon box having opposite end walls and side walls and a bottom center discharge opening wherein the improvement comprises, a safety grid structure positioned over at least the substantial center area of said box over said center discharge opening and which is detachably secured to at least the opposite side walls of said box whereby direct human access to said center discharge opening from the top of said box is prevented without interfering with the flow of grain through said grid, said grid including a plurality of cross members connected to said wagon side walls and a plurality of longitudinal members interconnecting said cross members, and each of said cross members having one end being secured to one side wall of said box by a bolt extending through one of said side walls and being connected to said cross member by a bracket means longitudinally movably connected to said cross member for said grid to fit in boxes of varying size with only the outer end of the bolt being exposed on the outside of said box and the remainder of said bolt extending along the length of said cross member inside said box.

2. A grain wagon box having opposite end walls and side walls and a bottom center discharge opening wherein the improvement comprises, a safety grid structure positioned over at least the substantial center area of said box over said center discharge opening and which is detachably secured to at least the opposite side walls of said box whereby direct human access to said center discharge opening from the top of said box is prevented without interfering with the flow of grain through said grid, and said grid including a plurality of members connected to at least some of said wagon side and end walls,- said members having one end being secured to one side or end wall of said box by a bolt connected to one of said side or end walls and being connected to said member by a bracket means longitudinally movably connected to said member for said grid to fit in boxes of varying size with only the outer end of the bolt being connected to said one side or end wall and the remainder of said bolt extending along the length of said member inside said box.

3. The wagon of claim 2 wherein said center discharge opening is further defined as being in the center of the bottom of the box.

4. The wagon of claim 2 wherein said center discharge opening is further defined as being at the bottom and in the center of one of said side walls of said box.

5. The structure of claim 2 wherein said members include cross members having end cross members closely adjacent said wagon end walls and intermediate cross members between said end walls.

6. The structure of claim 2 wherein said cross members are positioned only over the center of said box and substantially distant from the opposite end walls whereby the top of said box is open at opposite ends.

7. The structure of claim 2 wherein said members include cross members extending between opposite side walls.

8. The structure of claim 7 wherein the other end of said cross members substantially abut against said other box side wall and a second bolt extends through said other side wall and is connected to said cross member by a bracket on the other end of said cross member.

9. The structure of claim 7 wherein said cross members are further defined as being hollow and tubular in cross-section.

10. The structure of claim 7 wherein said cross members are further defined as being angular in cross-section and having a pair 90 degree legs.

11. The structure of claim 7 wherein said members of said grid include additionally a plurality of longitudinal members interconnecting said cross members.

12. The structure of claim 11 wherein said longitudinal members are further defined as being rods, and said cross members include end cross members and at least one intermediate cross member, and said longitudinal members extend through at least said intermediate member.

13. The structure of claim 12 wherein said cross members are further defined as being tubular in cross-section and the opposite ends of said longitudinal members terminate in the tubular outermost cross members.

14. The structure of claim 12 wherein said longitudinal members have end portions at one end extending at 90 degrees to the longitudinal members with the end portions being on the outer side of said cross member closest the adjacent end of said box.

15. The structure of claim 14 wherein said longitudinal member includes a nut at the end opposite said 90 degree end portion positioned on the outer side of the cross member closest to the other opposite box end wall.

16. The structure of claim 14 wherein said cross members are further defined as being angled in cross section and having 90 degree legs.

* * * * *